(12) United States Patent  (10) Patent No.: US 9,211,517 B2
Iddir et al.  (45) Date of Patent: Dec. 15, 2015

(54) CATALYST RETAINER FOR RADIAL FLOW REACTOR

(71) Applicant: UOP LLC, Des Plaines, IL (US)

(72) Inventors: Hadjira Iddir, Hoffman Estates, IL (US); Michael J. Vetter, Schaumburg, IL (US); Joseph E. Zimmermann, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 100 days.

(21) Appl. No.: 14/030,783

(22) Filed: Sep. 18, 2013

(65) Prior Publication Data

US 2015/0078970 A1    Mar. 19, 2015

(51) Int. Cl.

| | |
|---|---|
| *B01J 8/02* | (2006.01) |
| *B01J 8/12* | (2006.01) |
| B01J 8/00 | (2006.01) |
| B01J 19/00 | (2006.01) |
| B01J 19/24 | (2006.01) |
| B01J 19/30 | (2006.01) |
| B01J 19/32 | (2006.01) |
| C07C 5/32 | (2006.01) |

(52) U.S. Cl.
CPC .......... *B01J 8/12* (2013.01); *B01J 2208/00884* (2013.01); *B01J 2208/00938* (2013.01)

(58) Field of Classification Search
CPC .............. B01J 8/00; B01J 8/02; B01J 8/0207; B01J 8/0214; B01J 8/0242; B01J 8/0257; B01J 19/00; B01J 19/0053; B01J 19/30; B01J 19/305; B01J 2208/00; B01J 2208/00796; B01J 2208/00884; B01J 19/32; B01J 2219/32; B01J 2219/322; B01J 2219/32203; B01J 2219/32237; B01J 2219/32241; C07C 5/32

See application file for complete search history.

(56) References Cited

U.S. PATENT DOCUMENTS

| | | | |
|---|---|---|---|
| 5,130,106 A | 7/1992 | Koves | |
| 6,059,961 A * | 5/2000 | Koves et al. | 208/146 |
| 7,621,988 B1 * | 11/2009 | Sun et al. | 96/152 |
| 7,687,673 B2 | 3/2010 | Ablin | |
| 2010/0288676 A1 * | 11/2010 | Senetar | 208/141 |

* cited by examiner

*Primary Examiner* — Natasha Young

(57) ABSTRACT

A catalyst retainer includes an inner particle retention device having apertures and a first non-apertured section; and an outer particle retention device having apertures and a second non-apertured section. The inner and the outer particle retention devices are spaced apart to define a particle retaining space of the retainer. The first non-apertured section and the second non-apertured section define a blanked-off section of the particle retaining space, and the blanked-off section is spaced from an end of the particle retaining space. The catalyst retainer also includes a louver with at least a portion located between the blanked-off section and the end of the particle retaining space. The louver extends into the particle retaining space at an angle with respect to an inner surface of the inner particle retention device. The louver introduces the fluid to the top catalyst free surface in a more uniform manner and hence prevents particle movement and attrition.

18 Claims, 3 Drawing Sheets

CATALYST RETAINER FOR RADIAL FLOW REACTOR

BACKGROUND OF THE INVENTION

1. Field of the Invention

The disclosure relates to a catalyst retainer for a radial flow reactor, and more particularly to a radial flow reactor catalyst retainer having a louver in the catalyst seal area.

2. Description of the Related Art

Hydrocarbon conversion processes are common in the refining and petrochemical industry. For example, the production of an alkylene (e.g., propylene) can be obtained by the dehydrogenation of an alkane (e.g., propane) through catalytic dehydrogenation in a radial flow reactor. The reactants in a radial flow catalytic dehydrogenation process pass through a reaction zone containing catalyst in a substantially horizontal direction in the case of a vertically oriented cylindrical reactor. Often, the catalyst is retained in an annular zone between an inner particle retention device (e.g., an inlet screen) and an outer particle retention device (e.g., an outlet screen) in the forms of inner and outer cylinders, respectively. The devices form a flow path for the catalyst particles moving gradually downward via gravity, until they become spent and must be removed for regeneration. The devices also provide a way to distribute gas feeds to the catalyst bed and collect products at a common effluent collection zone. When the radial fluid flow is away from the center of the reactor, the passage of fluid is radially through a first retention device (inner screen), the bed of catalyst particles, and through a second retention device (outer screen).

Certain problems with radial flow reactors have been recognized. For example, U.S. Pat. No. 5,130,106 discusses the phenomenon of void blowing in a radial flow reactor. Void blowing involves the creation of a void in a catalyst bed wherein the void allows catalyst particles to blow around and create catalyst fines. Void blowing can be caused by an overall upward displacement of the catalyst bed. U.S. Pat. No. 5,130, 106 describes one means to eliminate upper displacement of a catalyst bed by providing sufficient resistance to upward pressure. Specifically, catalyst particles that counteract upward pressure are located in a blanked-off section of the screens. The blanked-off section is an area above the screen openings. This means that there is little gas flow through the catalyst particles in this section of the catalyst bed. Friction between the particles and the interior walls increase the necessary pressure to upwardly displace the particles. Furthermore, the particles are added to the blanked-off section of the screens creating a catalyst seal surface in the blanked-off area.

In some catalytic dehydrogenation radial flow reactors, plugging and pressure drop buildup within the catalyst seal area and the outer screen of the reactor may be observed. This mechanism may increase the operating pressure which in turn may lead to lower paraffin to olefin conversion rate.

Therefore, what is needed is an improved radial flow reactor having a catalyst retainer that minimizes plugging and pressure drop buildup within the reactor.

SUMMARY OF THE INVENTION

The foregoing needs are met by a catalyst retainer and a radial flow reactor according to the invention.

According to one aspect, a retainer for particles is provided that includes an inner particle retention device having apertures and a first non-apertured section. The retainer also includes an outer particle retention device having apertures and a second non-apertured section. The inner particle retention device and the outer particle retention device are spaced apart to define a particle retaining space of the retainer. The first non-apertured section and the second non-apertured section define a blanked-off section of the particle retaining space that is spaced inward from an end of the particle retaining space. The retainer also includes a louver with at least a portion thereof positioned between the blanked-off section and the end of the particle retaining space. The louver extends into the particle retaining space at an oblique angle with respect to an inner surface of the inner particle retention device.

According to another aspect, a system for radial flow contact of a reactant stream with catalyst particles is provided that includes a reactor vessel. The system further includes a catalyst retainer disposed in the reactor vessel, the catalyst retainer including an inner particle retention device having apertures and an outer particle retention device having apertures. The inner particle retention device and the outer particle retention device are spaced apart to define a catalyst retaining space of the catalyst retainer. The inner particle retention device defines an axial flow path of the reactor vessel and the outer particle retention device and an inner surface of a wall of the reactor vessel define an annular flow path of the reactor vessel. The inner particle retention device has a first imperforate section and the outer particle retention device has a second imperforate section. The first imperforate section and the second imperforate section define a blanked-off section of the catalyst retaining space. The blanked-off section being spaced inward from an end of the catalyst retaining space. The system further includes a louver having at least a portion thereof located between the blanked-off section and the end of the catalyst retaining space. The louver extends into the catalyst retaining space at an oblique angle with respect to an inner surface of the inner particle retention device.

According to another aspect a system for radial flow contact of a reactant stream with catalyst particles includes a reactor vessel. The system further includes a catalyst retainer disposed in the reactor vessel. The catalyst retainer has an inner particle retention device having apertures and an outer particle retention device having apertures. The inner particle retention device and the outer particle retention device are spaced apart to define a catalyst retaining space of the catalyst retainer. The inner particle retention device defines an axial flow path of the reactor vessel and the outer particle retention device and an inner surface of a wall of the reactor vessel define an annular flow path of the reactor vessel. The inner particle retention device has a first imperforate section and the outer particle retention device has a second imperforate section. The first imperforate section and the second imperforate section define a blanked-off section of the catalyst retaining space. The blanked-off section is spaced inward from an end of the catalyst retaining space.

The system further includes a perforated louver located between the blanked-off section and the end of the catalyst retaining space, the louver extends into the catalyst retaining space at an angle with respect to an inner surface of the inner particle retention device between 5 degrees to 45 degrees.

An advantage of this invention is to reduce the fluid tangential velocities on the catalyst bed free surface and prevent catalyst particle collisions and attrition in the seal area. A reactor catalyst retainer of the invention includes a perforated louver that diffuses the flow within the catalyst seal space permitting the flow to reach the catalyst bed more uniformly. The invention introduces the fluid to the top catalyst free surface in a more uniform manner and hence improves the flow and prevents particle movement and attrition.

These and other features, aspects, and advantages of the present invention will become better understood upon consideration of the following detailed description, drawings and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

Figure 1:
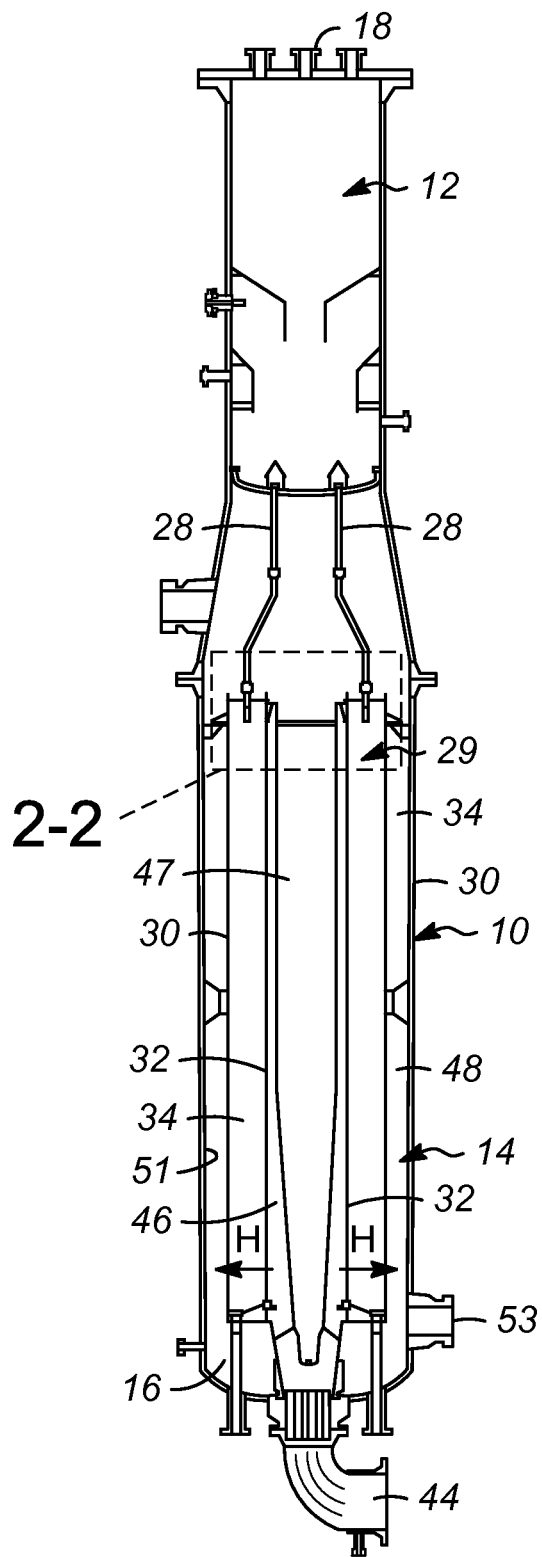
FIG. 1 is a cross-sectional view of a radial flow reactor.
Figure 2:
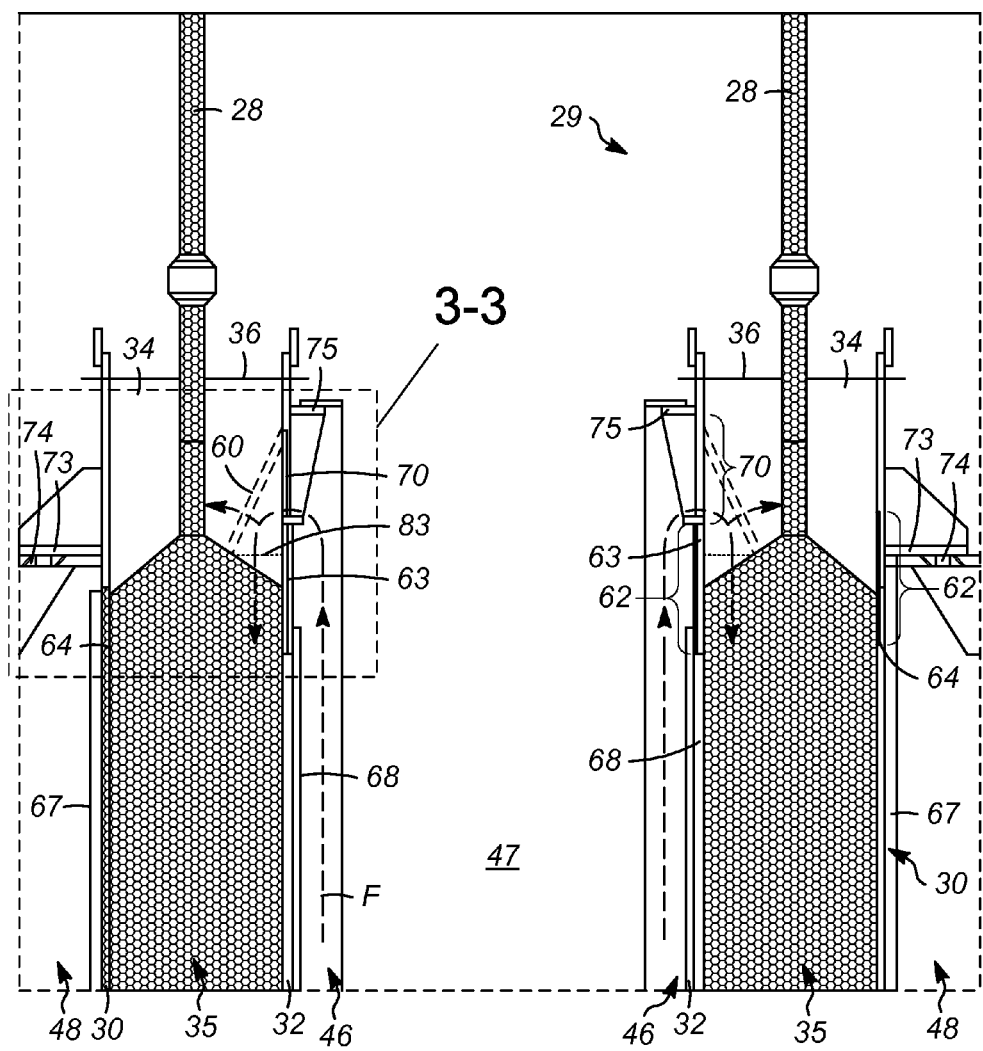
FIG. 2 is a detailed cross-sectional view of the catalyst seal area of the catalyst retainer of the radial flow reactor of FIG. 1, taken at line 2-2 of FIG. 1.

Looking first at FIGS. 1 and 2, there is shown a cross-section of a reactor for converting paraffinic hydrocarbons to olefinic hydrocarbons by contact with a particulate catalyst. The vertically oriented reactor vessel has a cylindrical shell 10 that confines a catalyst hopper 12, a reactor section 14, and a catalyst collection zone 16. At the top of catalyst hopper 12, there is a catalyst loading nozzle 18 for filling hopper 12 with fresh or regenerated catalyst particles. A series of particle supply conduits 28 are spaced around the bottom of hopper 12 and communicate catalyst particles to the reactor section 14. When used in a reactor, these particle supply conduits 28 are also referred to as catalyst transfer pipes.

The reactor section 14 includes a catalyst retainer 29 in the form of an outer retention screen 30 that surrounds a vertically oriented inner retention screen 32. In the embodiment of FIG. 1, the cylindrical shape of the outer retention screen 30 and the inner retention screen 32 define an annular particle retaining space 34 which retains catalyst particles 35. The top of the particle retaining space 34 is covered by a top closure 36. Catalyst particles 35 from conduits 28 are transferred through the top closure 36 and into the particle retaining space 34.

Reactants enter the reactor through a feed inlet nozzle 44. The feed inlet nozzle 44 openly communicates with an axial flow path 46 defined as that region lying directly inside the inner retention screen 32. A plug distributor 47 is positioned in the axial flow path 46. A plurality of apertures in the outer retention screen 30 and the inner retention screen 32 allow reactants to flow along a substantially horizontal flow path (see arrow H in FIG. 1) through the catalyst bed contained within the particle retaining space 34 and into an annular flow path 48 defined by the outer retention screen 30 and an inner surface 51 of the shell 10 of the reactor vessel.

Reactants are then carried from flow path 48 through an outlet nozzle 53. The feed inlet nozzle 44 and the effluent outlet nozzle 53 together with the axial flow path 46 and the annular flow path 48 provide a means for establishing gas flow across the particle retaining space 34.

The dehydrogenation of the paraffinic hydrocarbons can be carried out in a conventional manner within the reaction section 14. The feed to inlet nozzle 44 usually includes a combination of fresh paraffinic hydrocarbon feed, recycled hydrogen and recycled unconverted hydrocarbons. In its preferred form, the dehydrogenation process consumes a feed hydrocarbon comprising normal paraffinic hydrocarbons having from 3 to 22 carbon atoms per molecule. The reactant stream is heated and the reactor is maintained at proper dehydrogenation conditions of temperature and pressure which are well known to those skilled in the art before it is passed through the bed of catalyst contained in the particle retaining space 34. The reactants entering the catalyst bed are in vapor phase condition. The effluent removed from nozzle 53 undergoes treatment for the separation of hydrogen by condensing the heavier components into a liquid phase process stream and the recovery of hydrogen and light hydrocarbon gas. This gas supplies hydrogen that is combined with the incoming feed stream. An example of a process for the catalytic dehydrogenation of a paraffin stream to yield olefins can be found in U.S. Pat. No. 8,282,887. It should be appreciated that the invention is not limited to catalytic dehydrogenation.

Figure 3:
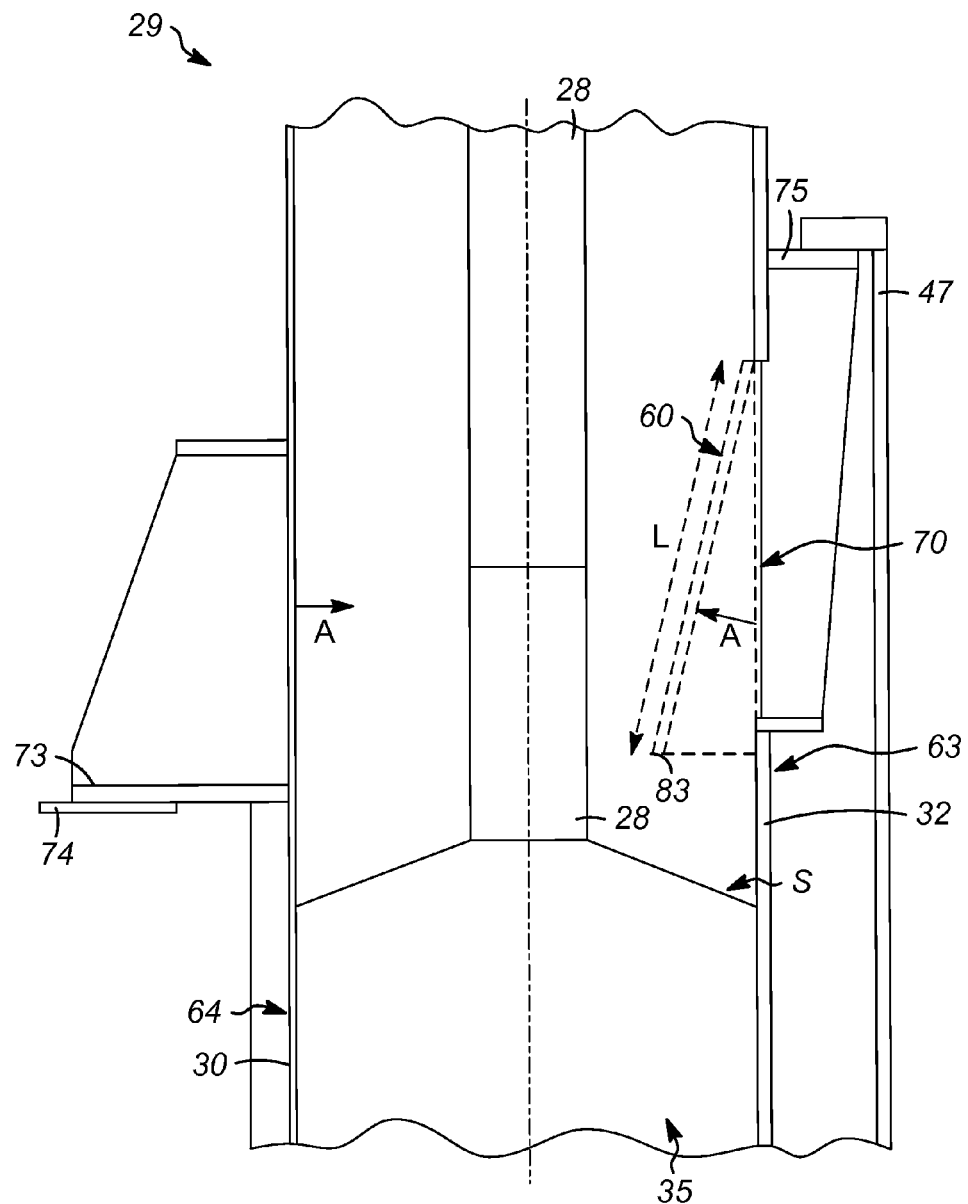
FIG. 3 is a detailed cross-sectional view the catalyst seal area of the catalyst retainer of the radial flow reactor of FIGS. 1 and 2 with a louver positioned in the catalyst retainer, taken at line 3-3 of FIG. 2.

Referring to the area within line 3-3 of FIG. 2 and to FIG. 3, there is shown a top section of the catalyst retainer 29. FIG. 3 shows the catalyst retainer with a louver 60 installed, and FIG. 2 shows the catalyst retainer 29 before installation of the louver 60. The top section of the catalyst retainer 29 includes a blanked-off section 62 of the particle retaining space 34. The blanked-off section 62 is formed from a first non-apertured section 63 of the inner retention screen 32 and a second non-apertured section 64 of the outer retention screen 30. Below the blanked-off section 62 are an apertured section 67 of the outer retention screen 30 and an apertured section 68 of the inner retention screen 32. A flange 73 engages a ledge 74 to suspend the catalyst retainer 29 in the shell 10, and a flange 75 suspends the plug distributor 47.

A ventilation screen 70 is located above the blanked-off section 62 of the catalyst retainer 29. Fluid flow F can enter the particle retaining space 34 through the screen 70. The particle supply conduits 28 open below the top end of the blanked-off section 62. There is little gas flow through the catalyst particles in the blanked-off section 62 of the catalyst bed. Friction between the catalyst particles 35 and the interior walls increase the necessary pressure to upwardly displace the particles 35. Furthermore, the particles 35 are added to the blanked-off section 62 creating a catalyst seal surface S in the blanked-off section 62.

It was discovered that one cause of pressure buildup in a radial flow reactor is the seal catalyst free surface movement, attrition and accumulation of the resulting fines at the reactor catalyst seal area and outer screen causing plugging. Certain radial flow reactors operate at a higher pressure and therefore, the flow rate reaching the seal area ventilation screen is large enough to create high velocities in the reactor seal area region around the catalyst free surface S creating fines that may deposit on the outer retention screen 30.

The invention improves the current seal area ventilation screen design by adding the louver 60 at the seal ventilation screen 70 area to help split and diffuse the increased flow before reaching the catalyst free surface S. The louver 60 is shown in FIG. 3. In one non-limiting embodiment, the louver 60 is frustoconical and perforated. The louver 60 can be perforated to define 15% to 60% open area in the louver 60, or 15% to 40% open area in the louver 60, or 20% to 40% open area in the louver 60, or 25% to 35% open area in the louver 60, or 20% to 30% open area in the louver 60. In one non-limiting embodiment, the louver 60 may comprise a plate having a thickness of 1 to 30 millimeters, or a thickness of 1 to 25 millimeters, or a thickness of 1 to 15 millimeters, or a thickness of 1 to 10 millimeters. In one non-limiting embodiment, the louver 60 has a length L shown in FIGS. 3 of 100 to 300 millimeters, or 150 to 250 millimeters, or 175 to 225 millimeters.

Still looking at FIG. 3, the louver 60 extends away from the end of the particle retaining space 34 having the closure 36.

The louver extends into the particle retaining space 34 at an oblique angle A with respect to an inner surface of the outer retention screen 30 and an inner surface of the inner retention screen 32. The angle may be 5 degrees to 45 degrees, or 5 degrees to 35 degrees, or 5 degrees to 25 degrees, or 10 degrees to 20 degrees. At least a portion of the louver is located above the top of the blanked off section and below the top of the particle retaining space. The bottom 83 of the louver 60 may be located above the top of the blanked-off section 62 or may extend into the region generally adjacent to the blanked-off section 62 as illustrated in FIG. 3.

Due to the placement of the louver 60 adjacent the screen 70, the fluid F reaches the catalyst surface S with mostly axial velocities, therefore mitigating the particle movement and attrition. Computational Fluid Dynamic modeling of the invention showed a reduction in the fluid tangential velocities on the catalyst free surface S; most of the flow is axial. In this improved design, the maximum tangential velocities were almost lowered to zero, therefore the flow reaches the catalyst bed with axial velocities and would not disturb the free surface S.

Thus, the invention provides a catalyst retainer for a radial flow reactor, and more particularly a radial flow reactor catalyst retainer having a louver in the catalyst seal area to mitigating particle movement and attrition at the catalyst seal surface in the blanked-off section of the catalyst retainer.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A retainer for particles, the retainer comprising:
   an inner particle retention device having apertures and a first non-apertured section;
   an outer particle retention device having apertures and a second non-apertured section, the inner particle retention device and the outer particle retention device being spaced apart to define a particle retaining space of the retainer, the first non-apertured section and the second non-apertured section defining a blanked-off section of the particle retaining space, the blanked-off section being spaced from an end of the particle retaining space; and
   a perforated louver with at least a portion thereof positioned between the blanked-off section and the end of the particle retaining space, the louver extending into the particle retaining space at an oblique angle with respect to an inner surface of the inner particle retention device.

2. The retainer of claim 1 wherein:
   the louver is perforated to define 15% to 60% open area in the louver.

3. The retainer of claim 1 wherein:
   the louver is perforated to define 20% to 40% open area in the louver.

4. The retainer of claim 1 wherein:
   the angle is 5 degrees to 45 degrees.

5. The retainer of claim 1 wherein:
   the angle is 5 degrees to 25 degrees.

6. The retainer of claim 1 wherein:
   the louver extends away from the end of the particle retaining space.

7. The retainer of claim 1 wherein:
   the louver is frustoconical.

8. The retainer of claim 1 wherein:
   the louver is located adjacent a screened section of the inner particle retention device.

9. The retainer of claim 1 wherein:
   the inner particle retention device comprises a screen, and the outer particle retention device comprises a screen.

10. A system for radial flow contact of a reactant stream with catalyst particles, the system comprising:
    a reactor vessel;
    a catalyst retainer disposed in the reactor vessel, the catalyst retainer including an inner particle retention device having apertures and an outer particle retention device having apertures, the inner particle retention device and the outer particle retention device being spaced apart to define a catalyst retaining space of the catalyst retainer, the inner particle retention device defining an axial flow path of the reactor vessel, the outer particle retention device and an inner surface of a wall of the reactor vessel defining an annular flow path of the reactor vessel, the inner particle retention device having a first imperforate section and the outer particle retention device having a second imperforate section, the first imperforate section and the second imperforate section defining a blanked-off section of the catalyst retaining space, the blanked-off section being spaced from an end of the catalyst retaining space; and
    a perforated louver having at least a portion thereof located between the blanked-off section and the end of the catalyst retaining space, the louver extending into the catalyst retaining space at an oblique angle with respect to an inner surface of the inner particle retention device.

11. The system of claim 10 wherein:
    the louver is perforated to define 20% to 40% open area in the louver.

12. The system of claim 10 wherein:
    the angle is 5 degrees to 45 degrees.

13. The system of claim 10 wherein:
    the louver extends away from the end of the particle retaining space.

14. The system of claim 10 wherein:
    the louver is frustoconical.

15. The system of claim 10 wherein:
    the louver is located adjacent a screened section of the inner particle retention device.

16. The system of claim 10 wherein:
    a catalyst supply conduit extends into the blanked-off section of the catalyst retaining space.

17. A system for radial flow contact of a reactant stream with catalyst particles, the system comprising:
    a reactor vessel;
    a catalyst retainer disposed in the reactor vessel, the catalyst retainer including an inner particle retention device having apertures and an outer particle retention device having apertures, the inner particle retention device and the outer particle retention device being spaced apart to define a catalyst retaining space of the catalyst retainer, the inner particle retention device defining an axial flow path of the reactor vessel, the outer particle retention device and an inner surface of a wall of the reactor vessel defining an annular flow path of the reactor vessel, the inner particle retention device having a first imperforate section and the outer particle retention device having a second imperforate section, the first imperforate section and the second imperforate section defining a blanked-off section of the catalyst retaining space, the blanked-off section being spaced from an end of the catalyst retaining space; and a perforated louver located between the blanked-off section and the end of the catalyst retaining space, the louver extending into the catalyst retaining space at an angle with respect to an inner surface of the inner particle retention device, wherein the angle is 5 degrees to 45 degrees.

18. The system of claim 17 wherein:

the louver is frustoconical, and the louver is perforated to define 20% to 40% open area in the louver.

* * * * *